Dec. 15, 1936.  C. W. KLAUMINZER  2,064,794
VALVED NOZZLE
Filed Jan. 11, 1934
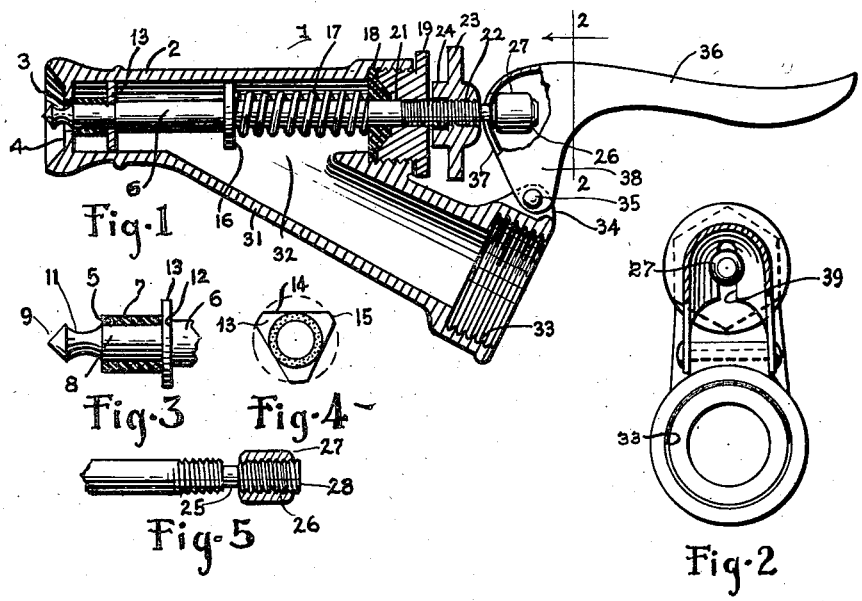
INVENTOR
CARL W. KLAUMINZER,
BY
Saywell & Wesseler,
ATTORNEYS Patented Dec. 15, 1936

2,064,794

UNITED STATES PATENT OFFICE 2,064,794

VALVED NOZZLE

Carl W. Klauminzer, Rocky River, Ohio; Florence A. Klauminzer, administratrix of said Carl W. Klauminzer, deceased Application January 11, 1934, Serial No. 706,248

5 Claims. (Cl. 299—131)

This invention, as indicated, relates to a valved nozzle. More particularly, it comprises a nozzle adapted to be placed upon a hose line or the like. It is particularly useful as an attachment for use on garden hose or on hose lines when used for the cleaning of automobiles and the like wherein control of the character of the discharge of the stream may be quickly and accurately varied. Change in the character of the discharge of the stream from a solid high speed jet to a slow trickle, or from a broad spray to a narrow spray, or the various intermediate forms of discharge which are possible with a suitable valved nozzle, may be quickly and accurately carried out with the construction herein provided, and it is quite usual to vary the character of the discharge with the distance of the hose line from the object against which the stream is directed. It is possible with the present apparatus to deliver a series of violent intermittent discharges to dislodge coatings of foreign material from a painted or lacquered surface or to remove cakes of mud from wheels and tires. It is also practical with the present apparatus to regulate the stream and to positively maintain such regulation by means of a simple locking device which may be readily altered when it is again desired to resume variable control of the discharge. Fluid pressure also assists the valve operation.

Heretofore, various types of valved nozzles have been provided, but such devices have not been simple of manufacture and of adequate leak-proof construction, nor have they permitted the rapid adjustment of the character of the discharge from one extreme to another. They have usually embodied mechanism involving difficulties in making the same leak-proof and maintaining the same in operative adjustment under severe conditions of usage. They have also presented obstructions to the free flow of liquid therethrough so that the maximum efficiency of the nozzle has been below what may be provided for in applicant's constructions.

The principal object of the present invention is to provide an improved valved nozzle for hose lines and the like wherein the structure will present but small obstruction to the maximum flow of liquid through the device and which will provide for rapid and accurate control of the character of the discharge from the nozzle at all times.

Another object of the invention is to provide a nozzle having structural parts lending themselves readily to quantity production at a low cost and with a high degree of accuracy of adjustment and with adequate provision to prevent leakage under all conditions of use.

Another object of the invention is to provide a structure wherein most of the operative mechanism is concealed within the casing and is yet so positioned as to present a minimum of obstruction to the free flow of fluid through the interior passageways of the nozzle.

Another object of the invention is to provide a simple operating device with a locking element associated therewith so that any desired character of discharge jet may be maintained over extended periods without readjustment or accidental disturbance of the adjustment decided upon.

Another object of the invention is to provide a compact type of valved nozzle wherein but slight variation is exhibited from the conventional type of nozzle and yet wherein the control of the discharge is conveniently provided for under conditions which will insure long service of the device under severe conditions of usage without leakage or undue wear of the parts.

A further object of the invention is to provide means to utilize the current flow to assist in operating the movable valve member during a part of its path of movement in the casing.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but several of various mechanical forms in which the principle of the invention may be used.

In said annexed drawing:

Fig. 1 is a side elevation, partly in section, of a device embodying the principles of the invention;

Fig. 2 is an end view, partly in section, of the structure shown in Fig. 1, taken along the line 2—2 shown in Fig. 1, looking in the direction of the arrows;

Fig. 3 is an enlarged detail view, in side elevation, of the front end of the plunger rod;

Fig. 4 is an enlarged detail view in front elevation of the guide member of the plunger rod shown in Figs. 1 and 3; and Fig. 5 is an enlarged detail view in side elevation of the terminal portion of the plunger rod, showing the ball bearing construction.

As is clearly shown in Figs. 1 to 5, inclusive, the preferred form of construction comprises a casing 1 having an elongated substantially cylindrical upper section 2 suitably shaped at its forward end to provide a discharge orifice 3 centrally of an inwardly extending flange 4 forming a valve seat against which shoulders 5 on the forward end of a plunger rod 6 are adapted to bear. The seal against the valve seat may be provided by means of a sleeve 7 of suitable material to form a liquid-tight joint when pressed against the inner face of the flange. The sleeve may be formed of metal of suitable character, for example lead or alloys thereof, or may be formed of rubber, or the like. The sleeve is preferably engaged over a reduced section 8 formed adjacent the forward end of the plunger rod, which preferably has a forward portion in the form of an extension having a conical projection 9 at its extreme end, and a grooved intermediate portion 11 connecting it with the reduced section 8 of the plunger rod. Against the shoulder 12 on the rod formed by the reduced forward section, a guide 13 preferably in the form of a centrally apertured disc having cut-away portions 14 on each of three sides thereof is provided, being held in position by the frictional engagement of the sleeve 7 upon the reduced portion of the plunger rod. The outer edges 15 of the guide member bear against the inner cylindrical wall of the chamber and maintain the plunger rod in a central position. The plunger rod 8 is provided at an intermediate position with a bearing member in the form of a disc 16 against which a coil spring 17 abuts. The disc has a range of travel from its closed position against the current pressure for a portion of its path until it is moved out of the main fluid path and in this way serves as a blade or fin against which the pressure acts to close the valve. The other end of the spring bears against a packing washer 18 having a conical rearward end received in a recess of complementary shape in the forward face of a packing nut 19 which provides a leak-proof slideway 21 through which the plunger rod engages. The outer end of the plunger rod is formed with a screw-threaded section 22 upon which the locking nut 23 is engaged, said locking nut, when rotated inwardly, bearing by means of a reduced portion 24 against the outer face of the packing nut 19. The rearward end of the plunger rod is formed with a narrow neck portion 25 which serves as a point of engagement for the operating lever presently to be described. The extreme end of the plunger rod is provided with screw threads 26, upon which a sleeve 27, shaped so as to provide a bearing member adjacent the groove, is engaged, the extreme end 28 of the plunger rod preferably being peened over to prevent disengagement of the member 27.

The cylindrical upper section 2 of the casing thus forms the housing for the valve mechanism, the rearward portion receiving the spring. The forward portion of the upper section provides a substantially free fluid passageway when the valve spring is compressed into the rearward portion, the water, or other fluid, being supplied through a lower section 31, of the casing 1 which is positioned angularly below the upper section 2 and which merges with said upper section at a point centrally of the lower side of said upper section and has an elongated opening 32 at such point of merger within the casing. Thus water pressure assists in closing the valve.

The lower section is provided at its free end with a screw-threaded recess 33 to receive the terminal member (not shown) of a hose or the like, and on the upper side adjacent said recessed portion is formed with an upstanding lug 34, transversely apertured to receive a bearing pin 35 which serves as a pivot for the operating lever 36.

The lever 36 is preferably formed of pressed metal of substantially L-shape and presenting a convex outer surface with a concave under surface. The shorter arm 37 of the lever is cut away adjacent its central portion to provide a pair of parallel side members 38, which are provided with alined apertures to engage over the pivot pin 35 heretofore referred to. Above the cut-away portion of the lever a short slot 39 is formed, as is more clearly shown in Fig. 2, said slot opening into said cut-away portion at its lower end. The slot is of a width to engage over the narrow neck portion 25 of the plunger rod 8 immediately in advance of the bearing provided by the sleeve 27 against which the under surface of the lever bears.

The bearing is concealed beneath the lever and the lever is so shaped at its top and side portions as to provide a comfortable hand hold for the operator.

It will be noted that the casing may be readily cast and easily machined and the parts assembled with a minimum of effort. The device may be maintained in operative leak-proof condition without special tools. By unscrewing the packing nut 19 the plunger rod, together with the spring and valve member may be withdrawn rearwardly from the upper section, and adjustment or replacement of any of the parts readily made.

Other modes of applying the principle of my invention may be employed instead of the one explained, change being made as regards the mechanism disclosed, provided the means stated by any of the following claims or the equivalent of such stated means be employed.

I therefore particularly point out and distinctly claim as my invention:

1. An apparatus of the character described, having in combination a hollow casing formed substantially in the shape of a Y, a valve seat in said casing adjacent its forward end, a movable valve structure enclosed within said casing and supported substantially entirely at its rearward end and having a guide member near its forward end reciprocating therewith, a member on said movable valve structure projecting rearwardly from said casing, a spring for actuating said valve structure mounted adjacent its rearward end and housed in one leg of the Y and substantially out of the fluid path when the valve is retracted, and independent means disposed externally of said casing for engaging said projecting member of said valve structure for retracting the same.

2. An apparatus of the character described, having in combination a hollow casing formed substantially in the shape of a Y, a valve seat in said casing adjacent its forward end, a movable valve structure enclosed within said casing and supported substantially entirely at its rearward end and having a guide member near its forward end reciprocating therewith, a member on said movable valve structure projecting rearwardly from said casing, a spring for actuating said valve structure mounted adjacent its rearward end and housed in one leg of the Y and substantially out of the fluid path when the valve is retracted, independent means disposed externally of said casing for engaging said projecting member of said valve structure for retracting the same, and means for locking the same in retracted position.

3. An apparatus of the character described, having in combination a hollow casing formed substantially in the shape of a Y, a valve seat in said casing adjacent its forward end, a movable valve structure enclosed within said casing and supported substantially entirely at its rearward end and having a guide member near its forward end and a spring abutment at an intermediate position reciprocating therewith, a member on said movable valve structure projecting rearwardly from said casing, a spring for actuating said valve structure bearing against said spring abutment and housed in one leg of the Y and substantially out of the fluid path when the valve is retracted, and independent means disposed externally of said casing for engaging said projecting member of said valve structure for retracting the same.

4. An apparatus of the character described, having in combination a hollow casing formed substantially in the shape of a Y, a valve seat in said casing adjacent its forward end, a movable valve structure enclosed within said casing and supported substantially entirely at its rearward end and having a guide member near its forward end reciprocating therewith, a member on said movable valve structure projecting rearwardly from said casing and having a ball terminal element, a spring for actuating said valve structure mounted adjacent its rearward end and housed in one leg of the Y and substantially out of the fluid path when the valve is retracted, and a slotted lever pivoted externally of said casing with the portions adjacent said slot engaging said ball terminal member of said valve structure for retracting the same.

5. An apparatus of the character described, having in combination a hollow casing formed substantially in the shape of a Y, a valve seat in said casing adjacent its forward end, a movable valve structure enclosed within said casing and supported substantially entirely at its rearward end and having a guide member near its forward end reciprocating therewith, a member on said movable valve structure projecting rearwardly from said casing and having a ball terminal element, a spring for actuating said valve structure mounted adjacent its rearward end and housed in one leg of the Y and substantially out of the fluid path when the valve is retracted, a slotted lever pivoted externally of said casing with the portions adjacent said slot engaging said ball terminal member of said valve structure for retracting the same, and a locking collar screw-threadedly engaged on said rearwardly projecting member in advance of said ball for locking the valve structure in any desired retracted position.

CARL W. KLAUMINZER.